May 24, 1927.
E. G. WENTWORTH
1,629,752
DIRIGIBLE HEADLIGHT FOR MOTOR VEHICLES
Filed April 19, 1926
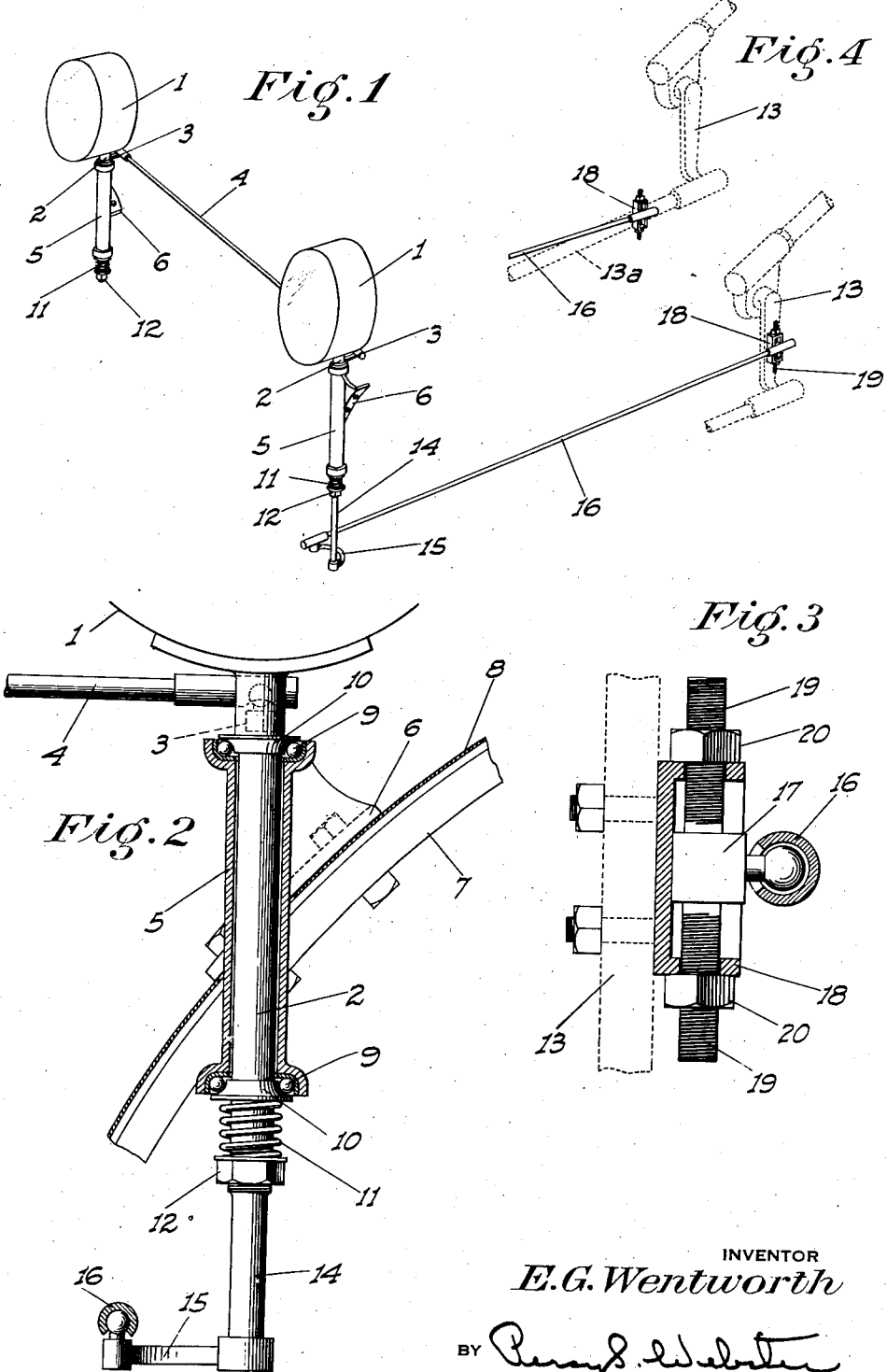
INVENTOR
E. G. Wentworth
BY *[signature]*
ATTORNEY Patented May 24, 1927.

1,629,752

UNITED STATES PATENT OFFICE.

ERNEST G. WENTWORTH, OF SACRAMENTO, CALIFORNIA.

DIRIGIBLE HEADLIGHT FOR MOTOR VEHICLES.

Application filed April 19, 1926. Serial No. 102,838.

This invention relates to improvements in dirigible headlight structures for motor vehicles, such as are arranged to turn when the front wheels turn, the present invention particularly representing an improvement over the structure for the same purpose shown in my Patent No. 1,319,818 dated October 28th, 1919.

In the previous device the headlights were fixed on the spring-suspended and vertically movable frame of the car, while the connection of the operating mechanism of the headlights was made with a movable member of the steering apparatus of the car which was incapable of vertical movement. This necessitated a yielding device to allow of the vertical movement of the frame with the action of the vertical springs without breaking or distorting the headlight operating mechanism.

The principal object of the present invention therefore is to eliminate the need of such a yielding device by connecting the operating mechanism of the headlights to the steering arm of the vehicle which is mounted on the frame of the car, as are the headlights themselves.

Another object of the invention is to provide a simple means for enabling the extent of turning movement of the headlights to be altered to suit different conditions of operation without altering the extent of turning movement of the wheels.

A further object of the invention is to mount the headlights in such a manner that while they may freely turn, any loose play is automatically taken up, and the headlights cannot rattle and become noisy even with severe jolting of the car and long use of the device.

These objects I accomplish by means of such structure and relative arrangement of parts as will fully appear by a perusal of the following specification and claims.

In the drawings similar characters of reference indicate corresponding parts in the several views:

Fig. 1 is a perspective diagram of my dirigible headlight structure.

Fig. 2 is a sectional elevation of the mounting arrangement of one of the headlights.

Fig. 3 is a transverse section of the adjustable means on the steering arm for altering the extent of throw of the operating rod.

Fig. 4 is a fragmentary view showing the headlight operating rod connected to a different member of the steering mechanism.

Referring now more particularly to the characters of reference on the drawings, the numeral 1 denotes the headlights, mounted on vertical spindles 2 from which adjacent their upper ends radial arms 3 project rearwardly, said arms being connected by a rod 4. The connection of the rod with the arms is preferably of a standard ball and socket construction—a type of device which provides for ease of movement with adjusting means for taking up wear as it occurs.

Each spindle projects through a tubular standard 5 provided with a bracket plate 6 which is adapted to be secured to a rigid member of the vehicle, such as the brace 7 of the mud guard 8, which brace projects upwardly and is rigidly fixed onto the frame of the car. The standards project through the mud guard to a certain distance therebelow.

Combined angular and thrust ball bearings 9 are mounted at the opposite ends of the standard, the inner braces 10 of these bearings being disposed about the spindle. The upper race is held against movement but the lower race is slidable on the spindle. Disposed about the spindle below the lower race is a compression spring 11, one end of the spring bearing against said race and the other end against an adjustable nut 12 on the spindle. It will therefore be seen that with this construction the races of both sets of bearings are always held in close contact with their respective balls, preventing vertical movement of the spindle relative to the standard without interfering with the free rotation of the spindle. If at any time the tension of the spring should require adjusting one way or the other, the nut may be retracted or advanced, as may be necessary.

The left hand spindle 2, or that one which is on the same side of the car as the steering arm 13 of the steering mechanism, has an extension 14 below the nut 12. The lower end of this extension carries a goose neck arm 15 to which one end of a rod 6 is flexibly connected.

This rod extends longitudinally of the vehicle and at its rear end is flexibly connected to a block 17. This block is mounted, for vertical sliding movement, in a guide member 18 which is rigidly fixed on the arm 13 in any suitable manner. It will therefore be seen that with the reciprocating movement of said arm, which causes the steering of the front wheels of the car in the usual manner, the headlights will be correspondingly turned. The arm 15 is of course so disposed rlative to its spindle and to the steering mechanism that the headlights will turn in the same direction as the wheels of the car.

In order to enable the extent of movement of the headlight to be altered, as may be desired, vertical studs 19 extend both ways from the block 17 and project through the top and bottom of the member 18. Nuts 20 on the studs outwardly of the member 18 and bearing thereagainst, not only hold the block 17 rigid, but enable it to be moved toward or away from the center of reciprocating movement of the arm 13. This, as will be evident enables a different extent of movement of the block longitudinally of the car to be had with a constant movement of the arm 13, and will cause a corresponding difference of movement of the headlights to be had.

The connections of the rod 16 with the arm 15 and block 17 are both of the ball and socket variety, to allow of the necessary universal movement of the parts relative to each other, without binding.

The members 7 to which the standard brackets are secured being fixed relative to the frame of the car, and the arm 13 being likewise fixed relative to the frame, there is never any relative movement between the headlights and the point of connection of the rod 16 with the steering mechanism which would necessitate the use of a yielding connection such as was previously used.

If desired, the member 18 may be mounted on the steering rod 13$^a$ to which the lower end of the arm 13 is attached, as shown in Fig. 5. The point of connection of the member 18 with said rod would preferably be close to the arm 13, in order that the vertical movement of said member 18 would be negligible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A dirigible headlight structure for motor vehicles including a vertical spindle for supporting a headlight turnably mounted on the vehicle, an arm projecting horizontally from the spindle, a rod connected at one end to the arm, a block to which the other end of the rod is connected, a vertical guide member for the block adapted for rigid attachment to a longitudinally movable part of the steering mechanism of the vehicle, and means for adjusting the setting of the block in the guide member.

2. A structure as in claim 1, said means including a vertically adjustable stud mounted in the guide member and secured to the block.

In testimony whereof I affix my signature.

ERNEST G. WENTWORTH.